(12) United States Patent
Lagergren et al.

(10) Patent No.: US 8,856,294 B2
(45) Date of Patent: *Oct. 7, 2014

(54) SYSTEM AND METHOD FOR CONVERTING A JAVA APPLICATION INTO A VIRTUAL SERVER IMAGE FOR CLOUD DEPLOYMENT

(75) Inventors: Marcus Lagergren, Lidingo (SE); Mikael Vidstedt, Solna (SE)

(73) Assignee: Oracle International Corporation, Redwood Shores, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/476,103

(22) Filed: Jun. 1, 2009

(65) Prior Publication Data

US 2010/0306355 A1 Dec. 2, 2010

(51) Int. Cl.
| | | |
|---|---|---|
| *G06F 15/177* | (2006.01) | |
| *H04L 12/24* | (2006.01) | |
| *G06F 9/445* | (2006.01) | |
| *G06F 9/455* | (2006.01) | |

(52) U.S. Cl.
CPC .............. *G06F 8/61* (2013.01); *H04L 41/0806* (2013.01); *G06F 2009/45562* (2013.01); *G06F 9/45558* (2013.01)
USPC ............................ 709/222; 709/220; 709/221

(58) Field of Classification Search
CPC ........................ H04L 41/0806; G06F 9/45558
USPC ................................ 709/211, 222, 228; 718/1
See application file for complete search history.

(56) References Cited

U.S. PATENT DOCUMENTS

| | | | |
|---|---|---|---|
| 7,080,378 | B1 * | 7/2006 | Noland et al. ................. 718/104 |
| 7,293,168 | B2 * | 11/2007 | Maeda et al. ...................... 713/1 |
| 8,156,301 | B1 | 4/2012 | Khandelwal |
| 8,176,486 | B2 | 5/2012 | Husain |
| 8,219,653 | B1 | 7/2012 | Keagy et al. |
| 8,321,558 | B1 | 11/2012 | Sirota |
| 8,381,264 | B1 | 2/2013 | Corddry et al. |
| 8,458,717 | B1 | 6/2013 | Keagy |
| 8,468,535 | B1 | 6/2013 | Keagy |
| 2003/0217131 | A1 * | 11/2003 | Hodge et al. ................... 709/223 |
| 2005/0198303 | A1 | 9/2005 | Knauerhase et al. |
| 2007/0033586 | A1 | 2/2007 | Hirsave et al. |
| 2007/0294676 | A1 | 12/2007 | Mellor |
| 2007/0300205 | A1 | 12/2007 | Scian |
| 2008/0059556 | A1 * | 3/2008 | Greenspan et al. ........... 709/201 |
| 2008/0201414 | A1 | 8/2008 | Husain |

(Continued)

FOREIGN PATENT DOCUMENTS

EP  2019358  1/2009

OTHER PUBLICATIONS

International Search Report dated Nov. 30, 2010 in re: PCT/US2010/036732, 11 pages.

(Continued)

*Primary Examiner* — Hieu Hoang
(74) *Attorney, Agent, or Firm* — Meyer IP Law Group (57) ABSTRACT

A system and method to convert a software application, such as a Java application into a virtual server image that is suitable for cloud deployment. In accordance with an embodiment, the system and method allows for building a hypervisor appliance containing a virtual machine running an application. In particular, the hypervisor appliance can be compatible with any hypervisor for server virtualization and the application virtual machine can be a Java Virtual Machine (JVM).

20 Claims, 7 Drawing Sheets

(56) References Cited

U.S. PATENT DOCUMENTS

| | | |
|---|---|---|
| 2008/0263258 A1 | 10/2008 | Allwell |
| 2008/0271016 A1 | 10/2008 | Chess et al. |
| 2008/0295092 A1 | 11/2008 | Tan et al. |
| 2009/0006534 A1 | 1/2009 | Fries et al. |
| 2009/0036111 A1 | 2/2009 | Danford |
| 2009/0070752 A1 | 3/2009 | Alpern et al. |
| 2009/0100420 A1 | 4/2009 | Sapuntzakis |
| 2009/0113423 A1* | 4/2009 | Hiltgen et al. ............... 718/1 |
| 2009/0164994 A1 | 6/2009 | Vasilevsky et al. |
| 2009/0172662 A1* | 7/2009 | Liu ............................... 718/1 |
| 2009/0276771 A1* | 11/2009 | Nickolov et al. ............ 717/177 |
| 2009/0319688 A1* | 12/2009 | Mason et al. ............... 709/242 |
| 2010/0027552 A1 | 2/2010 | Hill |
| 2010/0070970 A1 | 3/2010 | Hu |
| 2010/0115174 A1* | 5/2010 | Akyol et al. ................. 710/316 |
| 2010/0162238 A1 | 6/2010 | Warfield |
| 2010/0223383 A1* | 9/2010 | Salevan et al. .............. 709/226 |
| 2010/0250744 A1* | 9/2010 | Hadad et al. ................ 709/226 |
| 2010/0287280 A1* | 11/2010 | Sivan .......................... 709/226 |
| 2010/0306599 A1* | 12/2010 | Cota-Robles et al. ......... 714/48 |

OTHER PUBLICATIONS

Krsul, et al., "VMPlants: Providing and Managing Virtual Machine Execution Environments for Grid Computing", Proceedings of the ACM/IEEE SC2004 Conference Pittsburgh, PA, USA, 2004, 12 pages.

* cited by examiner

SYSTEM AND METHOD FOR CONVERTING A JAVA APPLICATION INTO A VIRTUAL SERVER IMAGE FOR CLOUD DEPLOYMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method for converting Java applications into virtual machine images suitable for cloud deployment.

BACKGROUND

Cloud computing is generally defined as a form of computing in which dynamic and/or virtualized resources are provided as services over a distributed network of physical computing machines or servers, such as the Internet. Client processes, software applications, and users thereof, are not required to have explicit knowledge or control over the technology infrastructure within the cloud. Instead, they can request or call upon services from the cloud, which are then provided by other providers within the cloud. As such, cloud computing promises software application developers with an easy means way of deploying their application to run simultaneously upon thousands of servers in a cloud.

To date, different solutions of deploying software applications in a cloud have emerged that are generally cloud-specific, i.e. the applications need to conform to a cloud/hypervisor specific application program interface (API) to run on their servers. Using this methodology, it is not easy for a cloud customer to migrate an application from one cloud provider to another cloud provider.

Cloud providers can address this problem somewhat by offering hypervisors in their clouds. Generally, a hypervisor acts as a layer between a server's hardware and its operating system. This provides an abstraction layer that allows each physical server to run one or more virtual servers, and effectively decouples the operating system and its applications from the underlying physical server. When used in a cloud, the cloud customer can supply a virtual machine image which contains the customer application to the hypervisor. The image will then be booted in potentially thousands of hypervisors in the cloud. Since there are generally only a few hypervisor types this approach standardizes the format for how the application developer has to package the application. Instead of creating a standalone application that fits into a specific cloud API, the developer now has to create a suitable virtual machine image.

However, the underlying problem remains as to how a software developer can convert their own, e.g. Java, application into a virtual machine image that can be easily deployed on many machines in a cloud. With current development tools the developer must create a virtual machine image that boots (or resumes) into the Java application. Generally, a virtual machine image has to be constructed by booting an operating system inside a hypervisor. From within this virtual operating system the boot process must be configured to start the application. Then the virtual machine is powered down, and a copy of the virtual machine image (which includes the disk) distributed to machines that run virtual images in a cloud. This is a very time consuming process, and is an area that embodiments of the present invention are intended to address.

SUMMARY

Disclosed herein is a system and method to convert a software application, such as a Java application into a virtual server image that is suitable for cloud deployment. In accordance with an embodiment, the system and method allows for building a hypervisor appliance containing a virtual machine running an application. In particular, the hypervisor appliance can be compatible with any hypervisor for server virtualization and the application virtual machine can be a Java Virtual Machine (JVM).

DETAILED DESCRIPTION

Disclosed herein is a system and method to convert a software application, such as a Java application into a virtual machine image that is suitable for cloud deployment. In accordance with an embodiment, the system and method allows for building a hypervisor appliance containing a second virtual machine running an application. In particular, the hypervisor appliance can be compatible with any hypervisor for server virtualization and the application virtual machine can be a Java Virtual Machine (JVM).

In accordance with an embodiment, the system includes an appliance builder application, that allows the system to take a Java application, and convert the application into a virtual server image that can then be deployed in a hypervisor, or for example within a cloud of hypervisors. In accordance with an embodiment, the generated virtual server image is a combination of a bootable part of a Java virtual machine, and a non-bootable part of the Java virtual machine, wherein the bootable part can subsequently load the non-bootable part. The non-bootable part of the Java virtual machine can then execute a Java application stored in the same virtual server image.

The appliance builder addresses the following problems:
1. Efficiency of creating the virtual server image. The bootable part of the Java virtual machine is significantly smaller than a general purpose operating system.
2. Fast booting of the Java application. The bootable part of the Java virtual machine has to perform significantly less work before it can start the non-bootable part of the Java virtual machine than a general purpose operating system.

3. Ease of generating virtual machine images for any hypervisor type, for example VMWare Player, Workstation and ESX, and OracleVM. The builder itself can be written in Java for platform transparency.
4. Significantly faster than alternative solutions that are based on actually running the hypervisor and setting up the application environment, and then taking a snapshot using the hypervisor.

A typical use of the appliance builder would be to take an application intended for deployment on an application server (such as a Weblogic server application that serves Web pages), and convert the application into an appliance. For example, a Weblogic server can be set up and started using the command:

java -cp . . . -jar server/weblogic.jar server/data

In accordance with an embodiment, an appliance configuration can be created for this setup as shown below:

```
<?xml version="1.0" encoding="UTF-8"?>
<applianceconfig xmlns:xsi="http://www.w3.org/2001/XMLSchema-
instance" xsi:noNamespaceSchemaLocation="applianceconfig.xsd"
version="2.5">
    <virtual-appliance memory="256 MB" cpus="1" disk="160 MB">
    <vm-name>default-vm</vm-name>
    <working-dir>/weblogic</working-dir>
    <java-arguments>-jar server/weblogic.jar server/data</java-
arguments>
    <network>
        <nics>
            <nic type="bridged"/>
        </nics>
        </network>
    </virtual-appliance>
</applianceconfig>
```

An alternative example of an appliance configuration file, for a different example application, is shown below:

```
<applianceconfig xmlns:xsi="http://www.w3.org/2001/XMLSchema-
instance" xsi:noNamespaceSchemaLocation="applianceconfig.xsd"
version="2.5">
    <virtual-appliance memory="1 GB" cpus="1" disk="256 MB">
    <vm-name>default-vm</vm-name>
    <working-dir>/application/myworkdir</working-dir>
    <java-arguments>-cp $JAVA_HOME/lib/tools.jar:. -Xmx128m -jar
MyApp.jar arg0 arg1 arg2</java-arguments>
    <nfs-mounts>
        <nfs-mount uid="513" gid="503">
            <mount-point>/test</mount-point>
            <server>file01.jrockitve.oracle.com</server>
            <server-path>/temp/user/testdir</server-path>
        </nfs-mount>
    </nfs-mounts>
    <kernel-arguments>
        <entry key="logLog" value="all"/>
        <entry key="netTcpTtl" value="20"/>
    </kernel-arguments>
    <network>
        <dns>
            <server-order> <server ip="172.22.17.100"/>
                <server ip="192.168.1.2"/>
            </server-order>
            <lookup-order>
                <name suffix="us.oracle.com"/>
                <name suffix="jrpg.oracle.com"/>
            </lookup-order>
        </dns>
        <nics>
            <nic network="eth0" type="bridged">
                <ip>172.23.22.22</ip>
                <netmask>255.255.255.0</netmask>
                <gateway>172.23.22.1</gateway>
                <mac>12:ab:34:cd:56:ef</mac>
            </nic>
```

```
        </nics>
        <hostname>example.oracle.com</hostname>
        </network>
        <locale-data>
            <locale>en_US</locale>
            <timezone>US/Pacific</timezone>
            <encoding>ISO-8859-1</encoding>
        </locale-data>
    </virtual-appliance>
    <jrockitve-image-url>ftp://jrockitve/jrockitve.bin</jrockitve-image-
url>
    <java-application-dir>path_to_java_application_dir</java-
application-dir>
</applianceconfig>
```

As described in further detail below, the appliance configuration can then be used to create a virtual server image for deployment in a cloud.

Figure 1:
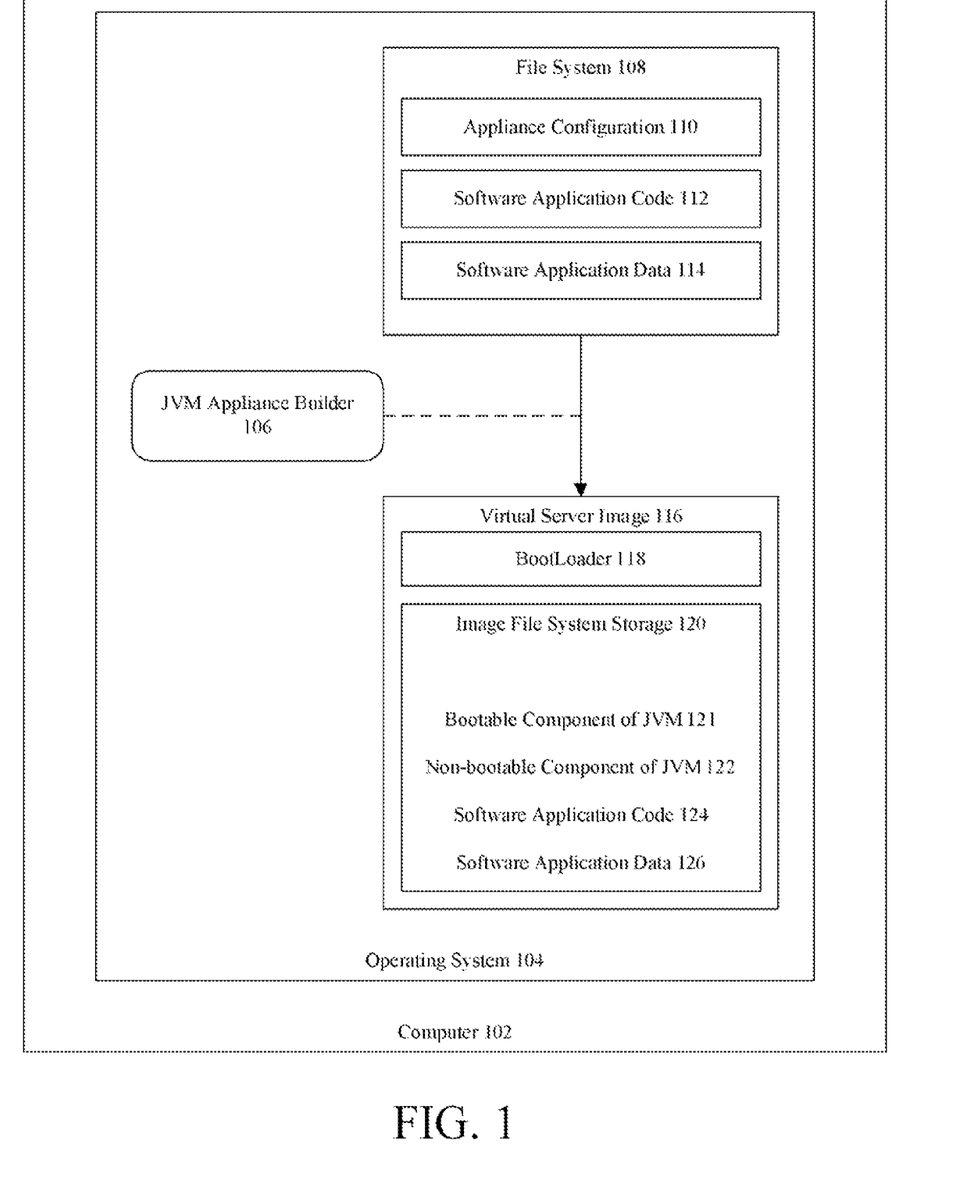
FIG. 1 shows an illustration of a system in accordance with an embodiment.

FIG. 1 shows an illustration of a system in accordance with an embodiment of the invention. As shown in FIG. 1, the system includes a computer 102 with a general operating system 104 executing thereon. The operating system maintains a file system 108, which in turn comprises an appliance configuration 110 or configuration file, a software application code 112, and a software application data 114.

In accordance with an embodiment, a Java virtual machine appliance builder 106, or a builder logic within the system, uses the appliance configuration 110 to create a virtual server image 116, which in turn comprises a bootloader 118; and an image file system storage 120.

The image storage comprises a bootable component of the Java virtual machine 121, a non-bootable component of the Java virtual machine 122, the software application code 124, and the software application data 126. The virtual server image can then be deployed within a cloud, and the non-bootable component of the Java virtual machine used to execute the Java application stored within the same virtual server image.

Figure 2:
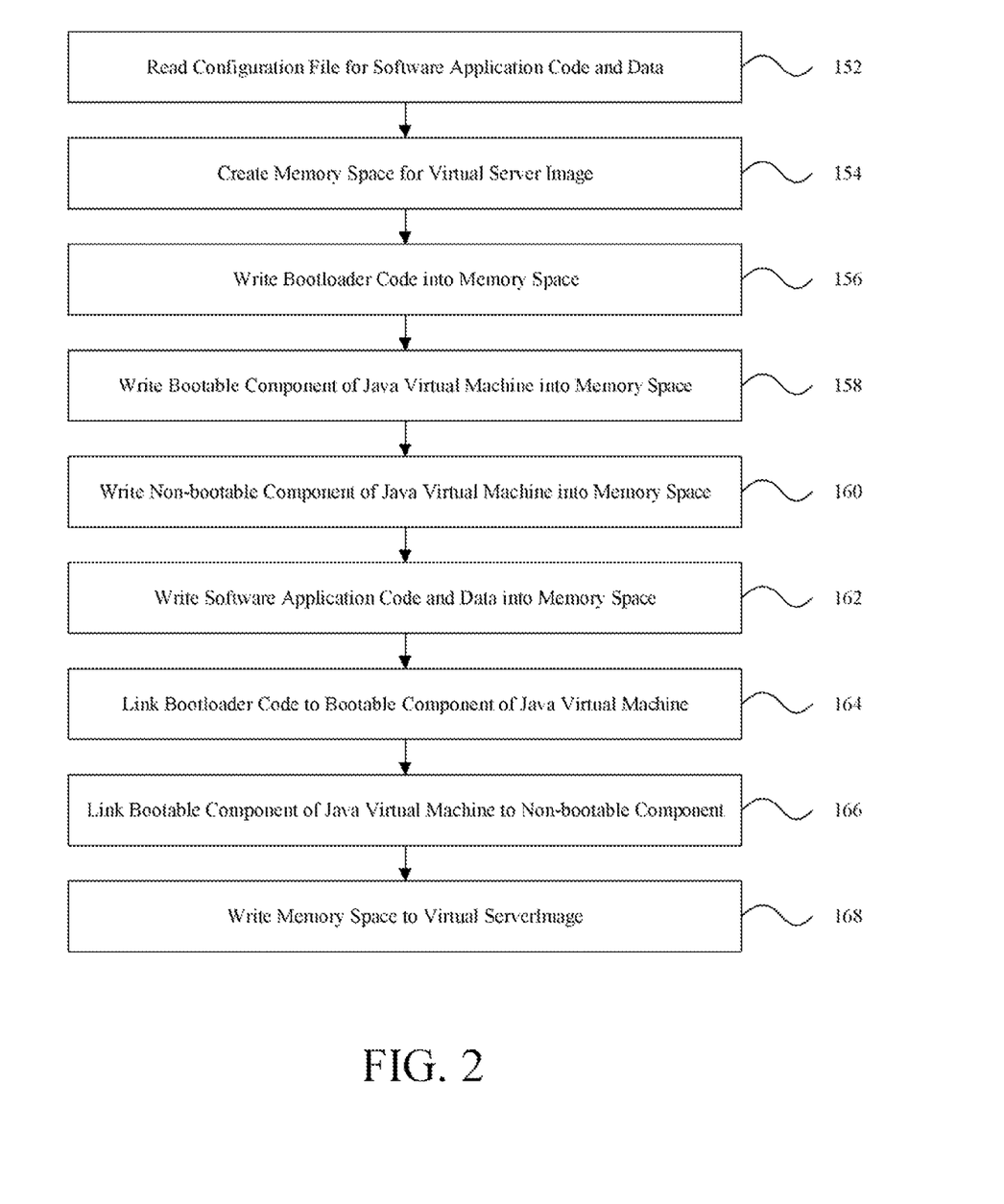
FIG. 2 shows a flowchart of a method in accordance with an embodiment, for generating a JVM appliance.

FIG. 2 shows a flowchart of a method in accordance with an embodiment, for generating a Java virtual machine (JVM) appliance. In accordance with an embodiment, the appliance builder is first started on the system as a standard Java application, such as:

java -jar appliance_builder.jar [hypervisor_type] [config_file]

As shown in FIG. 2, in step 152 the appliance builder reads the configuration file, and uses the instructions from the command line to determine which type of hypervisor is selected, and a configuration file to locate a software application code, a software application data, network settings, time and date and network file systems. In step 154, the appliance builder creates a memory space within the system for use by the virtual server image. In accordance with one embodiment such a memory space can reside in RAM. In accordance with an alternative embodiment the memory space can be a file in a file system. In step 156, the virtual server image is initialized with the bootloader code. Wether a bootloader code is placed into the virtual server image depends on which type of hypervisor type was selected when first starting the appliance builder.

Some hypervisors (for example, the VMWare hypervisor) use virtual server images that are effectively a snapshot of the sectors of a virtual harddisk. In accordance with an embodiment, for these hypervisors the bootloader code can be written into the first sector of the first bootable partition of the virtual harddisk. A bootloader, such as GRUB (GRand Unified Bootloader, provided as part of the GNU project), or a different type of bootloader, can be used for this purpose. The bootloader will then load the bootable part of the JVM from the file system in the virtual server image. If the GRUB bootloader is used, then the bootloader will use a configuration file located at /boot/grub/menu.cfg in the file system in the virtual server image, to find the bootable part of the JVM. Other types of bootloaders can use alternate configuration means.

Other hypervisors (for example, the Xen and Oracle VM hypervisors) use a standard file system format (for example, ext2) for their client images. In accordance with an embodiment, these hypervisors behave as GRUB or as a bootloader, and will read the /boot/grub/menu.cfg themselves. Therefore the virtual server images for these hypervisors do not contain the bootloader code.

Next, in step 158, a bootable component of the Java virtual machine is written to the virtual server image in the memory space.

In step 160, a non-bootable component of the Java virtual machine is written to the memory space together with, in step 162, the application code and data. In step 164, the bootloader code is then configured to execute the bootable component of the Java virtual machine. In one embodiment this can be done by updating /boot/grub/menu.cfg. In an alternative embodiment this can be done by updating the bootloader code itself. In step 166, the bootable component of the Java virtual machine is then configured to execute the non-bootable part of the Java virtual machine. The bootable component of the JVM is updated with the location of the non-bootable part of the JVM and the other information from the configuration file described earlier. In one embodiment this can be done by updating a file in the file system 120. In an alternative embodiment this can be done by updating the bootable component of the JVM itself.

In step 168, if the memory space was allocated in RAM, then the memory space is then written to a virtual server image. If the memory space was a file, then that file is now the virtual server image. This virtual server image can then be deployed throughout a cloud of hypervisors using the management tools generally provided with such cloud environments.

Figure 3:
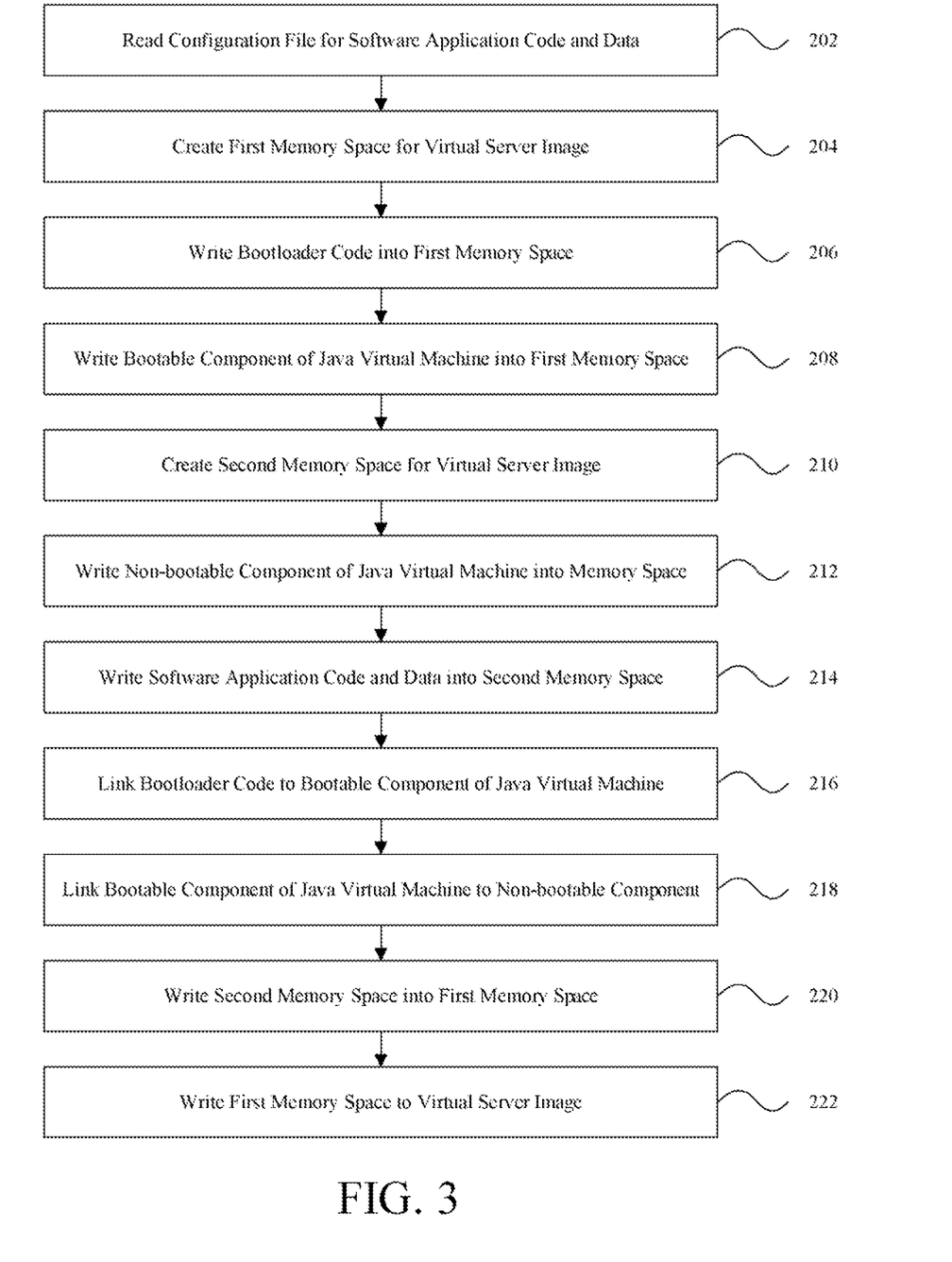
FIG. 3 shows a flowchart of a method in accordance with an alternative embodiment, for generating a JVM appliance.

FIG. 3 shows a flowchart of a method in accordance with an alternative embodiment, for generating a Java virtual machine (JVM) appliance. In particular, FIG. 3 illustrates the use of two or more memory spaces, which can be subsequently copied, concatenated, or otherwise used to prepare the virtual server image. As with the example described above, depending on the hypervisor used, the client image can either contain the bootloader code (for example, VMware), or can eliminate the need for the bootloader code (for example, Xen and Oracle VM).

As shown in FIG. 3, in step 202, the appliance builder reads the configuration file, and uses the instructions from the command line file to determine which type of hypervisor is selected, and a configuration file to locate a software application code, a software application data, network settings, time and date and network file systems. In step 204, the appliance builder creates a first memory space within the system for use by the virtual server image. In step 206, the virtual server image is initialized with the bootloader code. In step 208, a bootable component of the Java virtual machine is written to the virtual server image. In step 210, a second memory space is created within the system that will contain the image file system storage. In step 212, a non-bootable component of the Java virtual machine is written to the secondary memory space together with, in step 214, the application code and data. In step 216, the bootloader code is then configured to execute the bootable component of the Java virtual machine. In step 218, the bootable component of the Java virtual machine is then configured to execute the non-bootable part of the Java virtual machine. In step 220, the second memory space is then written into the first memory space, and in step 222, the first memory space is then written to a virtual server image.

Figure 4:
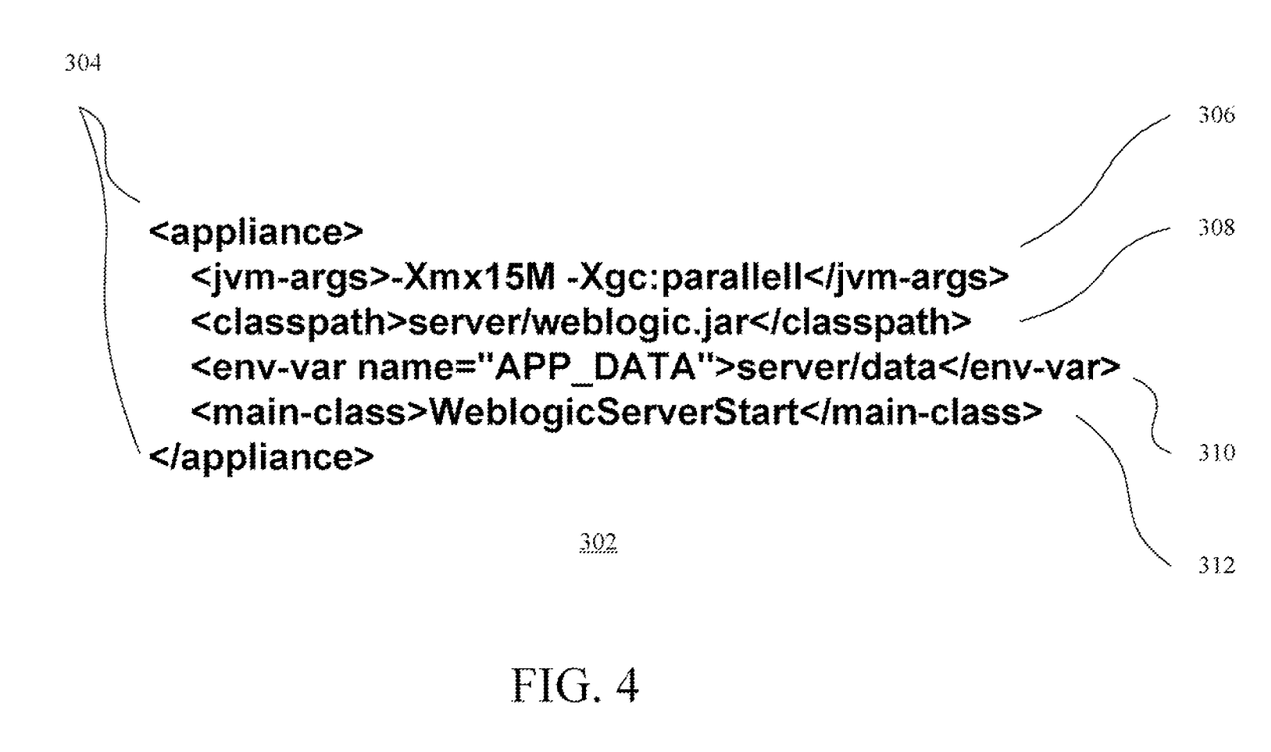
FIG. 4 shows an illustration of the contents of an appliance configuration in accordance with an embodiment.

FIG. 4 shows an illustration of the contents of an appliance configuration in accordance with an embodiment. As shown in FIG. 4, the appliance configuration 302 can be stored in a file on a computer readable medium or in a memory and includes, in accordance with an embodiment, appliance tags 304, indicating that the configuration file is intended to specify a virtual server image; a jvm-arguments component 306 defining how the non-bootable component of the Java virtual machine will be started; an application classpath component 308 defining the location of the application code; an application environment-variable component 310 defining the location of the application data; and additional components 312 defining additional variables.

Figure 5:
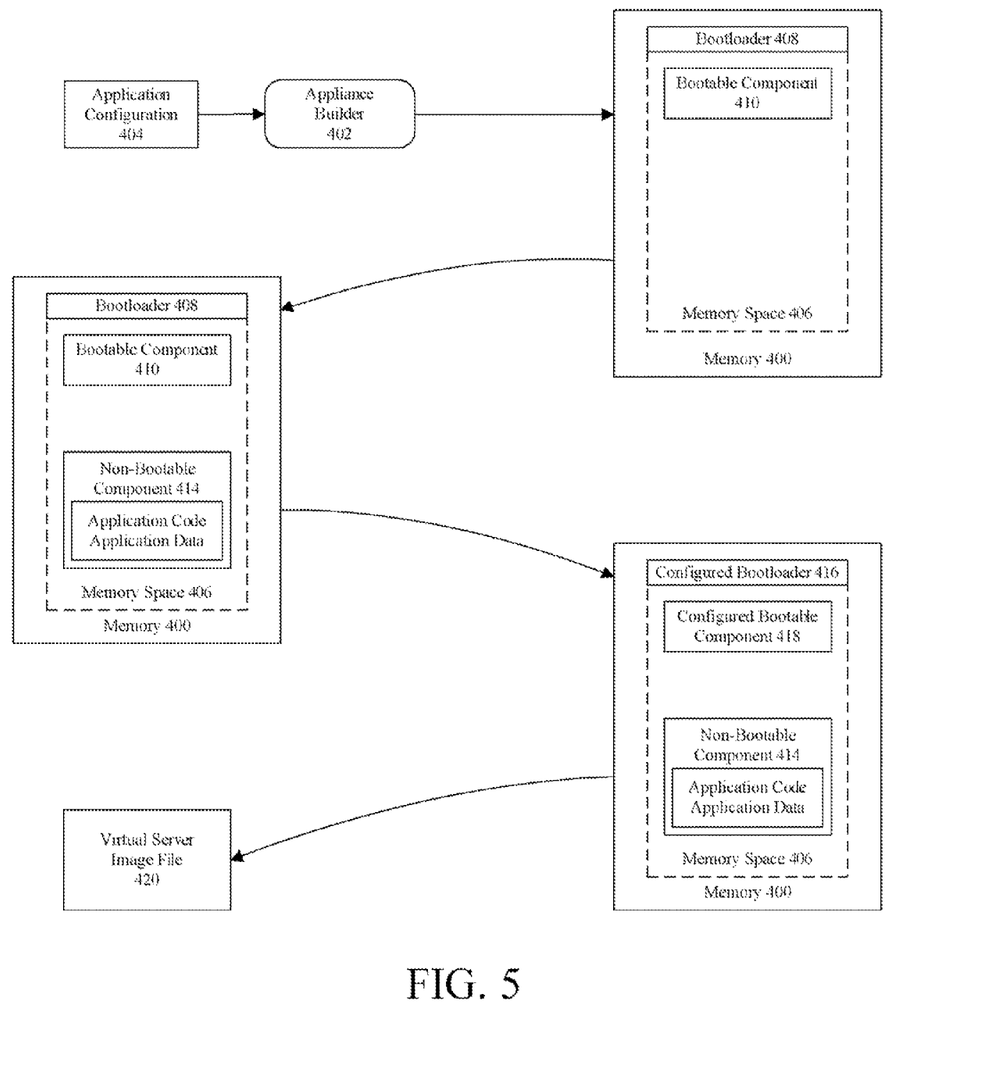
FIG. 5 shows an illustration of how a virtual server image is created, in accordance with an embodiment.

FIG. 5 shows an illustration of how a virtual server image is created, in accordance with an embodiment and the method described in FIG. 2. As shown in FIG. 5, the appliance builder 402 reads the configuration file 404, and uses the instructions therein to determine the type of hypervisor, and to locate a software application code and software application data. A memory space 406 is created within the system memory 400 for use by the virtual server image. The memory space/virtual server image is initialized with bootloader code 408, and a bootable component of the Java virtual machine 410 is written therein. A non-bootable component of the Java virtual machine 414 is then written therein, together with the application code and data. The bootloader code is then configured 416 to execute the bootable component of the Java virtual machine, and the bootable component of the Java virtual machine is configured 418 to execute the non-bootable part of the Java virtual machine. The memory space is then written to a virtual server file image 420, which can then be deployed throughout a cloud of hypervisors. In accordance with an alternative embodiment the memory space can be transmitted over a network to a cloud for deployment without storing a local file image.

Figure 6:
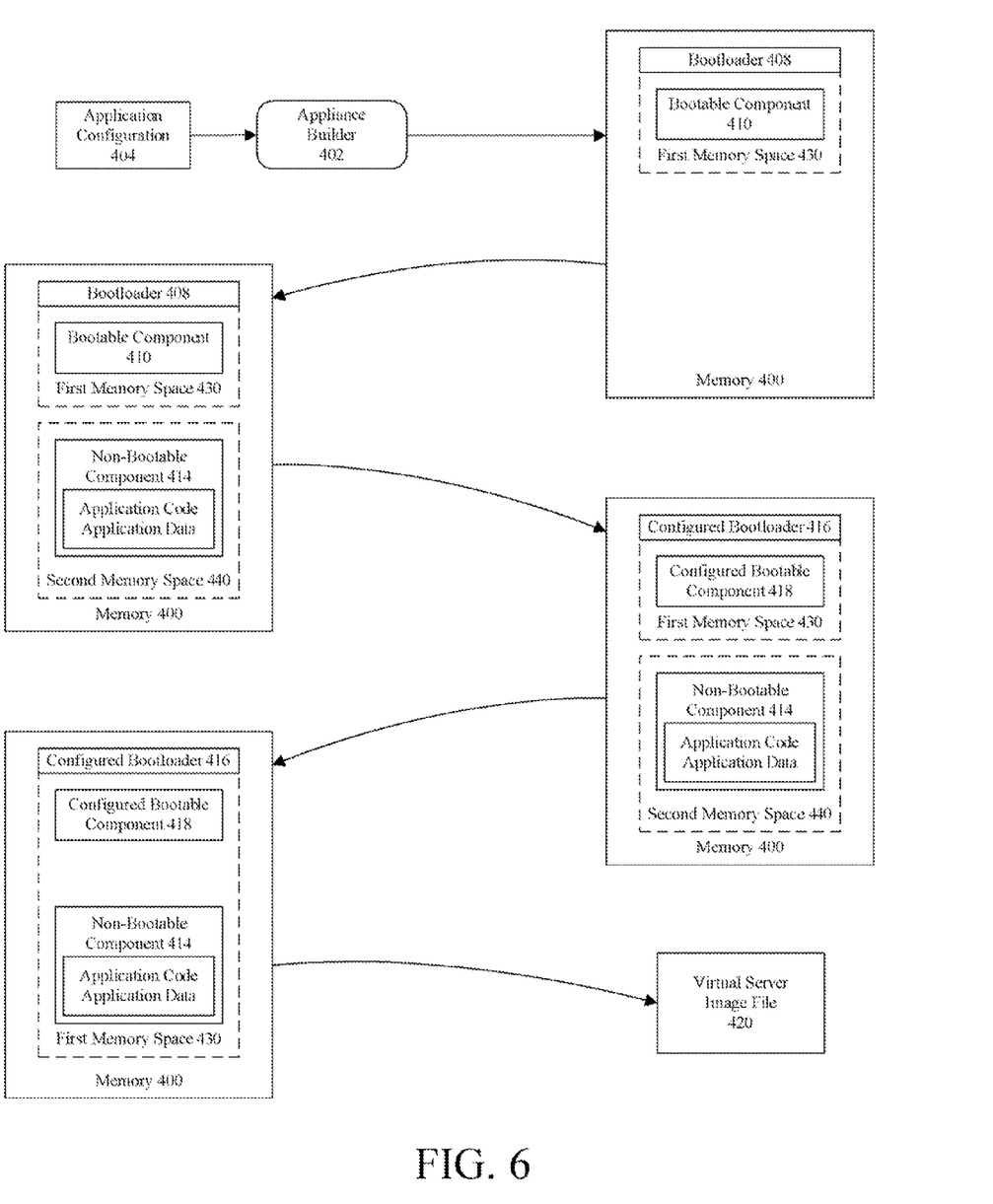
FIG. 6 shows an illustration of how a virtual server image is created, in accordance with an alternative embodiment.

FIG. 6 shows an illustration of how a virtual server image is created, in accordance with an alternative embodiment, and the method described in FIG. 3. In particular, FIG. 6 similarly illustrates the use of two or more memory spaces, which can be subsequently copied, concatenated, or otherwise used to prepare the virtual server image. As shown in FIG. 6, the appliance builder 402 reads the configuration file 404, and uses the instructions therein to determine the type of hypervisor, and to locate a software application code and software application data. A first memory space 430 is created within the system memory 400 for use by the virtual server image, the first memory space/virtual server image initialized with bootloader code 408, and a bootable component of the Java virtual machine 410 is written therein. A second memory space 440 is then created that will contain the image file system storage, and a non-bootable component of the Java virtual machine 414 is written therein, together with the application code and data. The bootloader code is then configured 416 to execute the bootable component of the Java virtual machine, and the bootable component of the Java virtual machine is configured 418 to execute the non-bootable part of the Java virtual machine. The second memory space is then written into the first memory space, and the first memory space is then written to a virtual server file image 420, which can then be deployed throughout a cloud of hypervisors. In accordance with an alternative embodiment the first memory space can be transmitted over a network to a cloud for deployment without storing a local file image.

Figure 7:
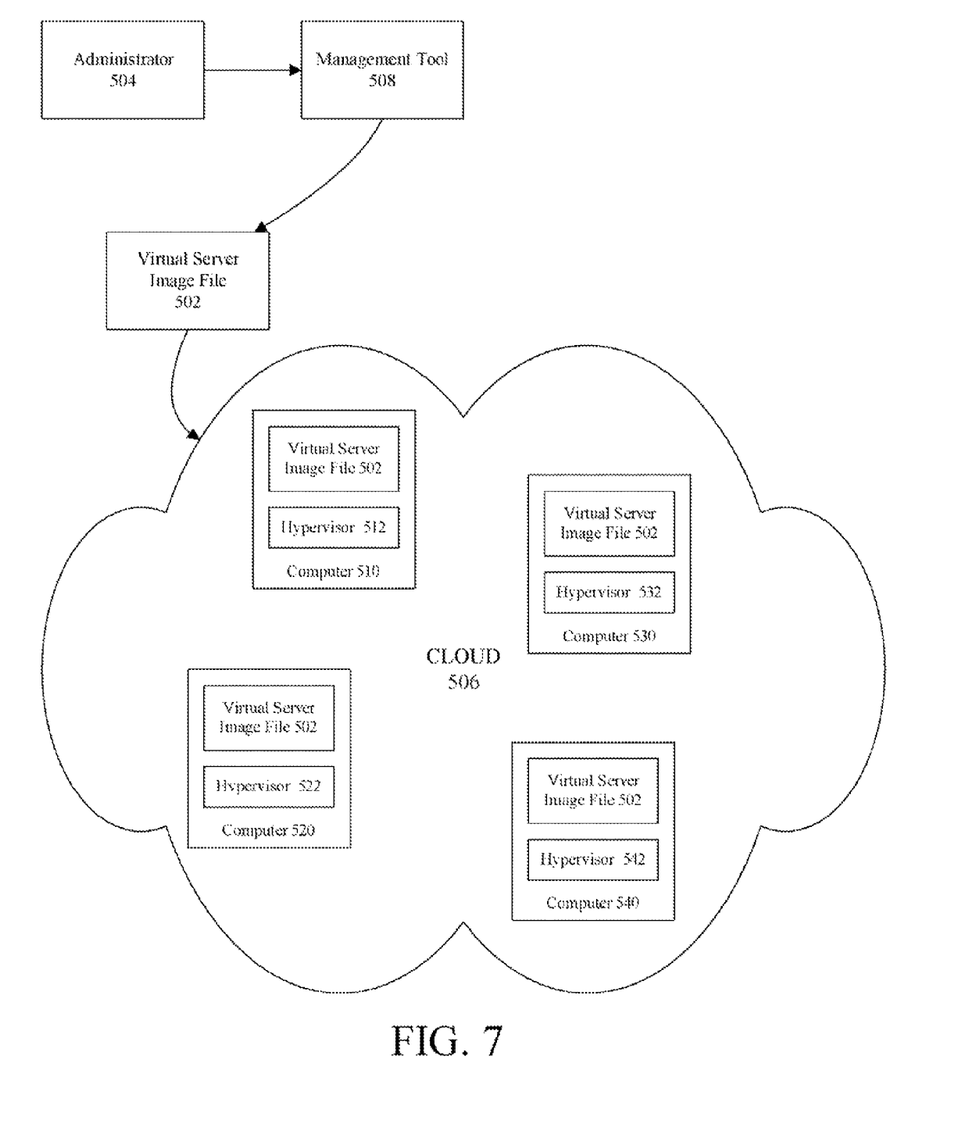
FIG. 7 shows an illustration of how a virtual server image can be deployed to a cloud, accordance with an embodiment.

FIG. 7 shows an illustration of how a virtual server image can be deployed to a cloud, accordance with an embodiment. As shown in FIG. 7, once the virtual server file image 502 is created, an administrator 504 can deploy the virtual server file image throughout a cloud 506 of hypervisors 512, 522, 532, 542 (each associated with one or more computers 510, 520, 530, 540), using the management tools 508 generally provided with such cloud environments.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for generating a virtual server image of a software application, which is suitable for cloud deployment, comprising:
   a computer including a processor, and a memory for use in creating virtual server images;
   an appliance configuration file that indicates configuration settings for use with a software application that includes an application code and application data, wherein the configuration settings include one or more virtual machine, classpath, and environment-variable settings to be used with the software application; and
   an appliance builder which is used to generate a virtual server image containing both the software application and a virtual machine capable of executing the software application, including performing the steps comprising
      receiving an indication as to a hypervisor type that will be used with the application,
      reading the appliance configuration file to determine the configuration settings therein,
      writing, into the memory or a similar storage, a bootable component of a virtual machine particular to the hypervisor type and in accordance with the configuration settings, wherein different forms of bootable component are used for different hypervisor types,
      writing, into the memory, a non-bootable component of the virtual machine, together with the software application, wherein the non-bootable component is used to execute the software application,
      configuring the bootable component to load and execute the non-bootable component, including updating the bootable component with the location of the non-bootable component and the configuration settings provided by the appliance configuration file, and
      outputting the bootable component and the non-bootable component, as configured by the configuration settings, as the virtual server image of the software application;
   wherein the virtual server image is preconfigured for deployment to a cloud comprising a plurality of physical computing machines that includes the hypervisor type indicated such that the bootable component is preconfigured to boot, and load and execute the non-bootable component and application without further configuration on said plurality of physical computing machines.

2. The system of claim 1, wherein the virtual machine inside the generated virtual server image contains a version of its own operating system necessary to run as a hypervisor client, and wherein the virtual machine inside the generated virtual server image is configured to boot when the virtual server image is started.

3. The system of claim 1, wherein the appliance builder performs an additional step comprising:
   writing bootloader code into a virtual server image stored in the memory, and
   configuring the bootloader code to execute the bootable component.

4. The system of claim 1, wherein the memory or similar storage is a random access memory (RAM), and wherein the outputting the virtual server image that includes the bootable component and the non-bootable component includes writing contents of the memory that includes the bootable component and the non-bootable component to a virtual server image file.

5. The system of claim 1, wherein the appliance builder performs an additional step comprising:
   sending the virtual server image to a cloud for immediate deployment.

6. The system of claim 1, wherein the memory or similar storage is a persistent file, and wherein the outputting the bootable component and the non-bootable component as the virtual server image includes updating and storing the persistent file accordingly.

7. The system of claim 1, wherein the generated virtual server image is deployed to a cloud where it is then executed by one or more hypervisors as part of the cloud.

8. A method for generating a virtual server image, comprising the steps of:
   executing a builder application on a computer including a processor, and a memory for use in creating a virtual server image;
   providing the software application that includes an application code and application data;
   reading an appliance configuration file that indicates configuration settings for use with the software application, including one or more virtual machine, classpath, and environment-variable settings;
   receiving an indication as to a hypervisor type that will be used with the application;

writing, into the memory or a similar storage, a bootable component of a virtual machine particular to the hypervisor type and in accordance with the configuration settings, wherein different forms of bootable component are used for different hypervisor types;

writing, into the memory, a non-bootable component of the virtual machine, together with the software application, wherein the non-bootable component is used to execute the software application;

configuring the bootable component to load and execute the non-bootable component, including updating the bootable component with the location of the non-bootable component and the configuration settings provided by the appliance configuration file; and outputting the bootable component and the non-bootable component, as configured by the configuration settings, as the virtual server image of the software application;

whereby the virtual server image is preconfigured for deployment to a cloud comprising a plurality of physical computing machines that include the hypervisor type indicated such that the bootable component is preconfigured to boot, and load and execute the non-bootable component and application without further configuration on said plurality of physical computing machines.

9. The method of claim 8, wherein the virtual machine inside the generated virtual server image contains a version of its own operating system necessary to run as a hypervisor client, and wherein the virtual machine inside the generated virtual server image is configured to boot when the virtual server image is started.

10. The method of claim 8, further comprising the steps of:
writing bootloader code into a virtual server image stored in the memory; and
configuring the bootloader code to execute the bootable component.

11. The method of claim 8, wherein the generated virtual server image contains a file system for storing the software application.

12. The method of claim 8, wherein the generated virtual server image is deployed to a cloud where it is then executed by one or more hypervisors as part of the cloud.

13. A non-transitory computer-readable storage medium, including instructions stored thereon, which when read an executed by a computer cause the computer to perform the steps comprising:

executing a builder application on a computer including a processor, and a memory for use in creating a virtual server image;

providing the software application that includes an application code and application data;

reading an appliance configuration file that indicates configuration settings for use with the software application, including one or more virtual machine, classpath, and environment-variable settings;

receiving an indication as to a hypervisor type that will be used with the application;

writing, into the memory or a similar storage, a bootable component of a virtual machine particular to the hypervisor type and in accordance with the configuration settings, wherein different forms of bootable component are used for different hypervisor types;

writing, into the memory, a non-bootable component of the virtual machine, together with the software application, wherein the non-bootable component is used to execute the software application;

configuring the bootable component to load and execute the non-bootable component, including updating the bootable component with the location of the non-bootable component and the configuration settings provided by the appliance configuration file; and outputting the bootable component and the non-bootable component, as configured by the configuration settings, as the virtual server image of the software application;

whereby the virtual server image is preconfigured for deployment to a cloud comprising a plurality of physical computing machines that includes the hypervisor type indicated such that the bootable component is preconfigured to boot, and load and execute the non-bootable component and application without further configuration on said plurality of physical computing machines.

14. The non-transitory computer-readable storage medium of claim 13, wherein the virtual machine inside the generated virtual server image contains a version of its own operating system necessary to run as a hypervisor client, and wherein the virtual machine inside the generated virtual server image is configured to boot when the virtual server image is started.

15. The non-transitory computer-readable storage medium of claim 13, further including instructions stored thereon, which when read an executed by a computer cause the computer to perform the steps further comprising:
writing bootloader code into a virtual server image stored in the memory; and
configuring the bootloader code to execute the bootable component.

16. The non-transitory computer-readable storage medium of claim 13, wherein the generated virtual server image contains a file system for storing the software application.

17. The non-transitory computer-readable storage medium of claim 13, wherein the generated virtual server image is deployed to a cloud where it is then executed by one or more hypervisors as part of the cloud.

18. The system of claim 1, wherein the appliance builder includes a command line interface, and is started using a command line that indicates the hypervisor type and the configuration file to be used in creating the virtual server image.

19. The method of claim 8, wherein the executing the builder application includes using a command line that indicates the hypervisor type and the configuration file to be used in creating the image.

20. The non-transitory computer-readable storage medium of claim 13, wherein the executing the builder application is by way of a command line that indicates the hypervisor type and the configuration file to be used in creating the image.

* * * * *

UNITED STATES PATENT AND TRADEMARK OFFICE
CERTIFICATE OF CORRECTION

| | | |
|---|---|---|
| PATENT NO. | : 8,856,294 B2 | Page 1 of 1 |
| APPLICATION NO. | : 12/476103 | |
| DATED | : October 7, 2014 | |
| INVENTOR(S) | : Lagergren et al. | |

It is certified that error appears in the above-identified patent and that said Letters Patent is hereby corrected as shown below:

In the Specification

In column 4, line 57, delete "Wether" and Insert -- Whether --, therefor.

In column 4, line 66, delete "Abootloader," and insert -- A bootloader, --, therefor.

In the Claims

In column 8, line 19, in Claim 1, delete "includes" and insert -- include --, therefor.

In column 10, line 19, in Claim 13, delete "includes" and insert -- include --, therefor.

Signed and Sealed this
Twenty-eighth Day of April, 2015

Michelle K. Lee
*Director of the United States Patent and Trademark Office*